(12) United States Patent
Lear

(10) Patent No.: US 8,002,293 B2
(45) Date of Patent: Aug. 23, 2011

(54) MATERIAL HANDLING APPARATUS AND SUPPORT THEREFOR

(75) Inventor: Jerel Richard Lear, Holyoke, MA (US)

(73) Assignee: The Durham Manufacturing Company, Durham, CT (US)

( * ) Notice: Subject to any disclaimer, the term of this patent is extended or adjusted under 35 U.S.C. 154(b) by 1124 days.

(21) Appl. No.: 11/682,960

(22) Filed: Mar. 7, 2007

(65) Prior Publication Data
US 2008/0217902 A1    Sep. 11, 2008

(51) Int. Cl.
*B62B 3/00*   (2006.01)

(52) U.S. Cl. .................... 280/79.3; 280/47.34

(58) Field of Classification Search ............. 280/79.11, 280/79.2, 79.3, 47.34, 47.35, 47.2; 16/29, 16/30, 31 R
See application file for complete search history.

(56) References Cited

U.S. PATENT DOCUMENTS

| | | | | |
|---|---|---|---|---|
| 1,445,395 A * | 2/1923 | Harvey | ........................ | 108/26 |
| 1,804,997 A * | 5/1931 | Manley | ........................ | 280/79.3 |
| 2,529,390 A * | 11/1950 | Hauer | ........................ | 16/29 |
| 3,540,614 A * | 11/1970 | Flagg | ........................ | 220/4.28 |
| 5,484,150 A * | 1/1996 | Yasutomi | ..................... | 280/79.3 |
| 5,745,951 A * | 5/1998 | Waner | .......................... | 16/31 R |
| 5,871,219 A * | 2/1999 | Elliott | .......................... | 280/79.3 |
| 5,921,566 A * | 7/1999 | Kern et al. | .................. | 280/79.11 |
| 7,017,879 B2 * | 3/2006 | Wetterberg et al. | ...... | 248/346.11 |
| 2006/0010645 A1 | 1/2006 | Bushey | | |

OTHER PUBLICATIONS

PCT International Search Report and Written Opinion for International application No. PCT/US2008/003075; International Filing Date: Mar. 7, 2008; Date of Mailing: Jun. 16, 2010; 12 pgs.

* cited by examiner

*Primary Examiner* — Frank B Vanaman
(74) *Attorney, Agent, or Firm* — Cantor Colburn LLP

(57) ABSTRACT

A material handling apparatus includes a support portion having a beam, a wheel disposed on one side of the beam, and a wheel bracket disposed on an opposing side of the beam. The wheel bracket has two legs and a yoke, and is disposed with the legs against the beam to define a gap between the beam and the yoke. The beam and wheel bracket each include a defined pattern of identically arranged holes, a first set arranged on a square pattern, a second set arranged on rectangular non-square pattern, and a third set arranged on a rectangular pattern similar to that of the second set but oriented ninety degrees to the second set. The wheel bracket is disposed having its defined pattern of holes aligned with the defined pattern of holes in the beam. The wheel, beam and wheel bracket are attached by fasteners passing through one set of holes and traversing the gap.

19 Claims, 7 Drawing Sheets

US 8,002,293 B2

MATERIAL HANDLING APPARATUS AND SUPPORT THEREFOR

BACKGROUND OF THE INVENTION

The present disclosure relates generally to a material handling apparatus, and particularly to a support for material handling apparatus.

Material handling apparatus available today for heavy industrial, light industrial, commercial, and residential use include such products as platform trucks, bar cradle trucks, mesh stock trucks, movable stock cabinets, and movable tool cabinets, to name a few. For such types of apparatus, mobility, sturdiness, ruggedness and longevity of use are important factors for the end user. As such, an important consideration for a purchaser is whether the support portion supporting the material handling portion of the apparatus will maintain its structural integrity regardless of the abuse a particular apparatus may experience during its use, especially when heavily loaded. While apparatus in use today may be suitable for their intended purpose, there remains a need in the art for improvements in the structural integrity between the support portion and the material handling portion of a material handling apparatus, so that the longevity of a particular apparatus may be extended and customer expectations exceeded, thereby improving customer satisfaction.

BRIEF DESCRIPTION OF THE INVENTION

An embodiment of the invention includes a material handling apparatus having a material handling portion and a support portion attached to the material handling portion. The support portion includes a beam, a wheel disposed on one side of the beam, and a wheel bracket disposed on an opposing side of the beam. The wheel bracket has two legs and a yoke between the two legs, and is disposed with the legs against the beam to define a gap between the beam and the yoke. The beam and the wheel bracket each include a defined pattern of identically arranged holes, a first set arranged on a square pattern, a second set arranged on rectangular non-square pattern, and a third set arranged on a rectangular pattern similar to that of the second set but oriented ninety degrees to the second set. The wheel bracket is disposed having its defined pattern of holes aligned with the defined pattern of holes in the beam. The wheel, beam and wheel bracket are attached by fasteners passing through one of the three sets of holes and traversing the gap.

Another embodiment of the invention includes a support portion for a material handling apparatus, the support portion having a beam, a wheel disposed on one side of the beam, and a wheel bracket disposed on an opposing side of the beam. The wheel bracket has two legs and a yoke between the two legs, and is disposed with the legs against the beam to define a gap between the beam and the yoke. The beam and the wheel bracket each include a defined pattern of identically arranged holes, a first set arranged on a square pattern, a second set arranged on rectangular non-square pattern, and a third set arranged on a rectangular pattern similar to that of the second set but oriented ninety degrees to the second set. The wheel bracket is disposed having its defined pattern of holes aligned with the defined pattern of holes in the beam. The wheel, beam and wheel bracket are attached by fasteners passing through one of the three sets of holes and traversing the gap.

BRIEF DESCRIPTION OF THE DRAWINGS

Referring now to the drawings, which are meant to be exemplary and not limiting, and wherein like elements are numbered alike in the accompanying Figures.

DETAILED DESCRIPTION OF THE INVENTION

An embodiment of the invention, as shown and described by the various figures and accompanying text, provides a material handling apparatus with a support portion having a beam, a wheel and a u-shaped wheel bracket, where the u-shaped wheel bracket serves to restrain wheel fasteners from undergoing orbital movement during in use service of the material handling apparatus. A defined pattern of holes in the beam and wheel bracket are aligned with each other to permit a first wheel having a square fastener pattern to be attached in a first orientation and a second orientation 90 degrees to the first orientation, and to permit a second wheel having a rectangular non-square fastener pattern to also be attached in a first orientation and a second orientation 90 degrees to the first orientation. By providing the beam with three groups of the defined pattern of holes, a first group being disposed proximate one end of the beam, a second group being disposed proximate an opposing end of the beam, and a third group being disposed proximate the middle of the beam, a single beam is capable of receiving a wheel and wheel bracket at any of the three groups of hole. By using swiveling and non-swiveling wheels, various wheel arrangements for the material handling apparatus can be produced, as will be discussed in more detail below.

Figure 1:
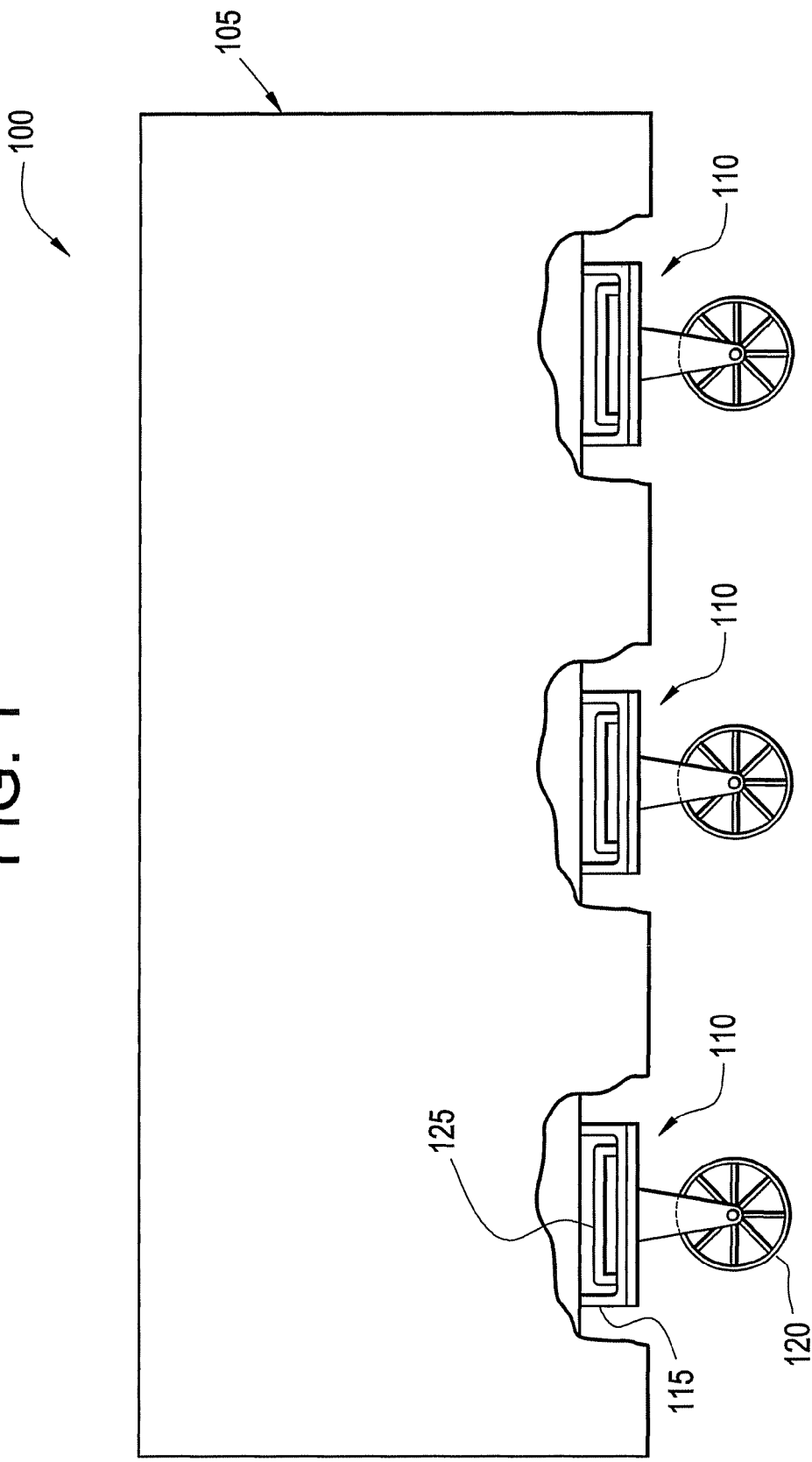
FIG. 1 depicts in block diagram view a material handling apparatus in accordance with an embodiment of the invention.

Referring now to FIG. 1, a material handling apparatus 100 is depicted generally having a material handling portion 105 and a support portion 110 attached to the material handling portion 105 by any suitable means. The support portion has a beam 115, a wheel 120 disposed on one side of the beam 115, and a wheel bracket 125 disposed on an opposing side of the beam 115. The beam 115 is attached to the material handling portion 105 by weld joints, or other means suitable for the purposes disclosed herein, such as bolts or self tapping screws for example. For example, a weld joint may be employed for heavy industrial uses, and non-weld fasteners may be employed for light industrial or home uses. The wheel 120 is attached to the beam 115 and wheel bracket 125 by fasteners passing through a set of holes, which will be discussed in more detail below. While FIG. 1 depicts a material handling apparatus 100 having three sets of beams, wheels and wheel brackets, it will be appreciated that this is exemplary only and that other configurations may be employed. For example, a first embodiment employs two beams, each beam having a wheel and wheel bracket at opposing ends of the respective beam, where the wheels are of the non-swiveling type, and a second embodiment employs three beams, the middle beam having two non-swiveling wheels and two wheel brackets similar to the first embodiment, and the two outer beams having one centrally located swiveling wheel and wheel bracket. Further detail relating to the various embodiments of the invention will be discussed below.

Figure 2:
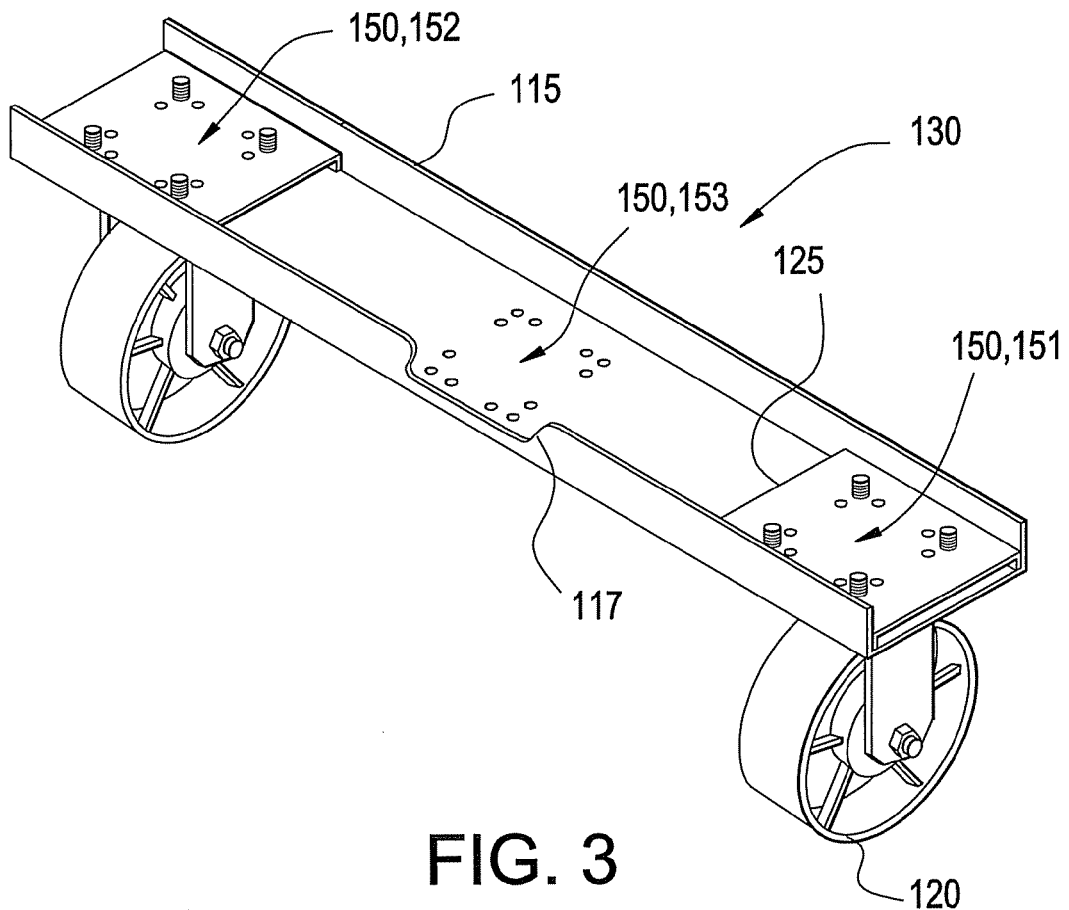
FIG. 2 depicts a top isometric view of part of a material handling support portion in accordance with an embodiment of the invention.
Figure 3:
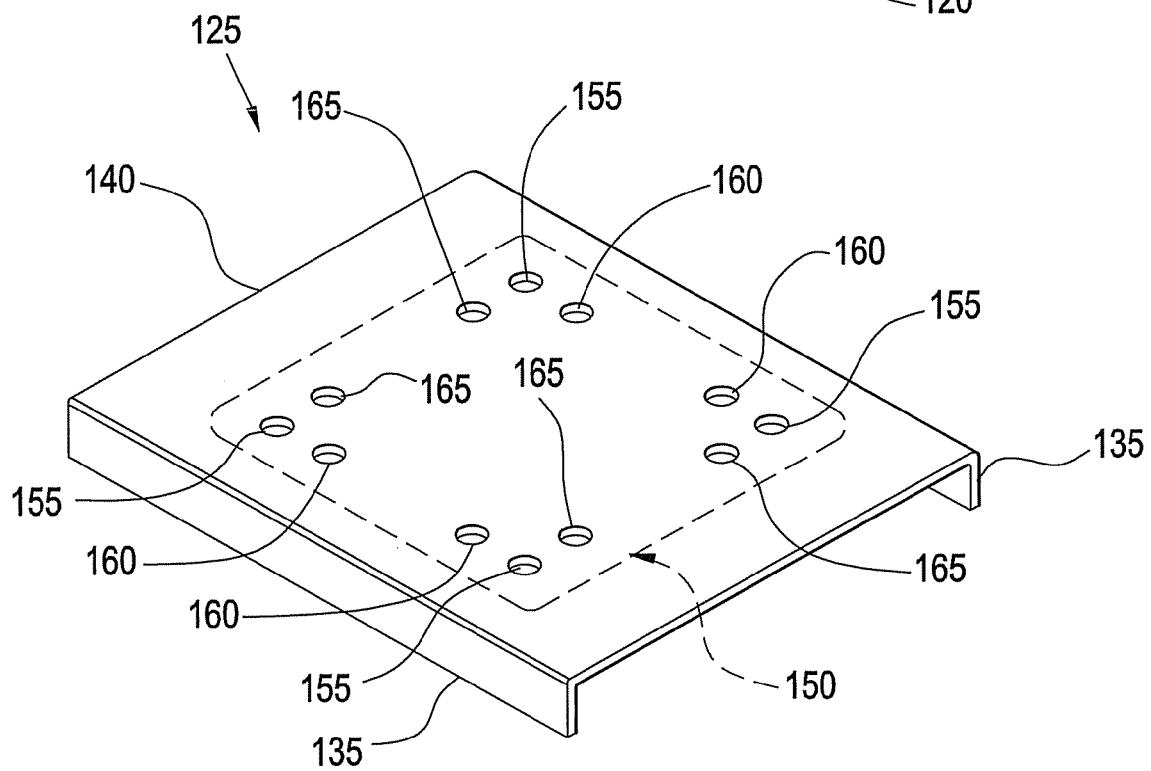
FIG. 3 depicts a top isometric view of a wheel bracket in accordance with an embodiment of the invention.
Figure 4:
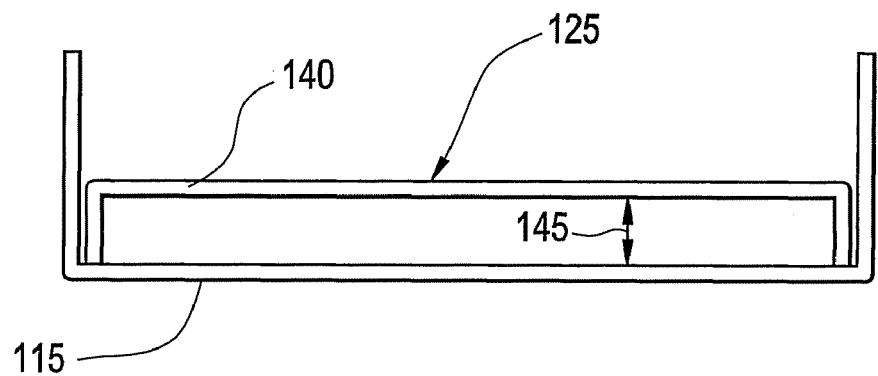
FIG. 4 depicts an end view of a beam and wheel bracket in accordance with an embodiment of the invention.

Referring now to FIG. 2, an assembly 130 of beam 115, wheel 120 and wheel bracket 125 is depicted, with the beam 115 having a cutaway section 117 to show hole detail otherwise hidden. The wheel bracket 125 is u-shaped and has two legs 135 and a yoke 140 therebetween, which is best seen by referring to FIG. 3. The wheel bracket is nested within a u-shaped beam 115 with the wheel bracket legs 135 against the beam 115 and a gap 145 between the beam 115 and the yoke 140, which is best seen by referring to FIG. 4. Referring back to FIGS. 2 and 3, the beam 115 and the wheel bracket 125 each have a defined pattern 150 of identically arranged holes, a first set 155 arranged on a square pattern, a second set 160 arranged on rectangular non-square pattern, and a third set 165 arranged on a rectangular pattern similar to that of the second set 160 but oriented ninety degrees to the second set 160. In an embodiment, the first set of holes 155, the second set of holes 160, and the third set of holes 165, each have four holes, thereby resulting in the defined pattern of holes having twelve holes.

Figure 5:
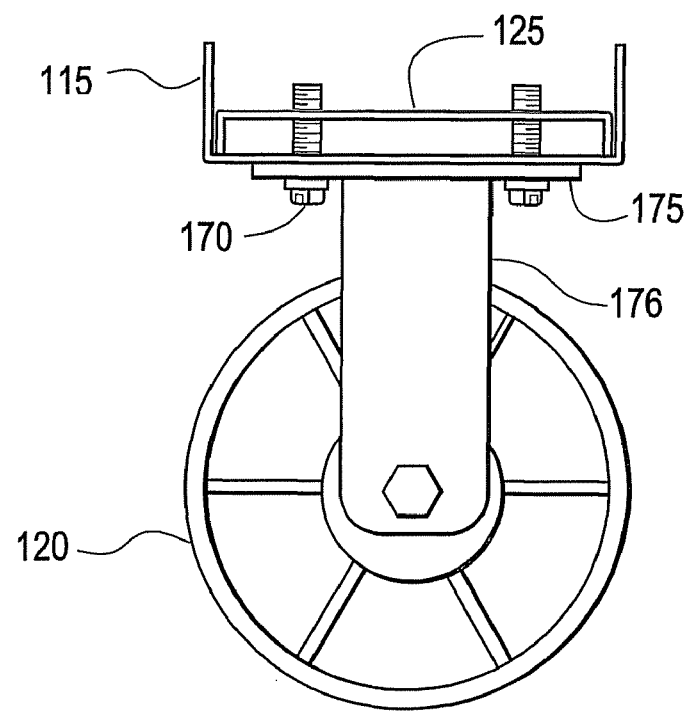
FIG. 5 depicts a side view of a non-swiveling wheel in accordance with an embodiment of the invention.
Figure 6:
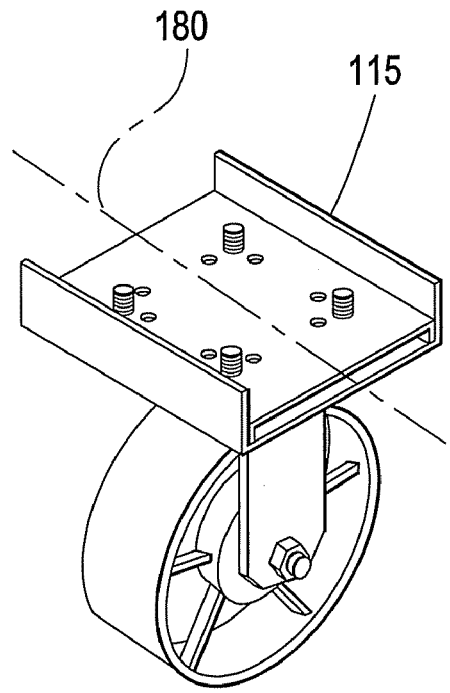
FIG. 6 depicts a top isometric view of the wheel of FIG. 5.
Figure 7:
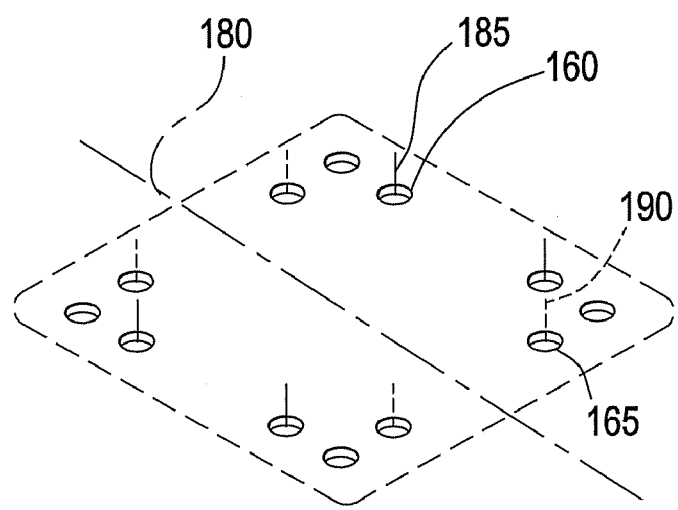
FIG. 7 depicts a perspective view of alternative fastener patterns in accordance with an embodiment of the invention.

With reference now to FIG. 2, the wheel bracket 125 is disposed having its defined pattern of holes 150 aligned with the defined pattern of holes 150 in the beam 115. In an embodiment the wheel bracket 125 is welded to the beam 115 once the holes are aligned, thereby adding to the overall structural integrity of the material handling apparatus 100. The wheel 120, beam 115, and wheel bracket 125 are attached by fasteners 170 passing through a baseplate 175 of the wheel 120 and through one of the three sets of holes 155, 160, 165 (best seen by referring to FIG. 5), depending on whether a large wheel or a small wheel is employed. The length of the legs 135 of wheel bracket 125 defining the gap 145 is selected so as to provide sufficient stability to the fasteners 170 to keep them straight and upright during rugged use of the material handling apparatus 100. By providing a u-shaped steel wheel bracket with a gap, as opposed to merely providing a thick block of steel for the wheel bracket, thinner gage steel can be used while still providing the desired degree of fastener restraint. In an embodiment, the beam and wheel bracket are made from 14-gage steel. In an embodiment, a large wheel having a large square baseplate would employ the first set of holes 155 for attaching the wheel in a first orientation such that the wheel rotates in a plane perpendicular to a longitudinal axis 180 of the beam 115 (see FIG. 6 for example), or for attaching the wheel in a second orientation 90 degrees to the first orientation such that the wheel rotates in a plane parallel to the longitudinal axis 180 of the beam 115. The square pattern of the first set of holes 155 provides for the needed 90 degree symmetry for attaching the large wheel in either of the two orientations. In another embodiment, a small wheel having a smaller rectangular non-square baseplate would employ the second set of holes 160 for attaching the wheel in a first orientation such that the wheel rotates in a plane perpendicular to a longitudinal axis 180 of the beam 115, and would employ the third set of holes 165 for attaching the wheel in a second orientation 90 degrees to the first orientation such that the wheel rotates in a plane parallel to the longitudinal axis 180 of the beam 115 (see FIG. 7 for example, depicting solid lines 185 for fasteners in the second set of holes 160, and dashed lines 190 for fasteners in the third set of holes 165). The rectangular non-square arrangement of the second and third sets of holes 160, 165 provide for attaching the small wheel in either of the two orientations.

While FIG. 2 depicts the beam 115 having three of the defined pattern of holes 150, it will be appreciated that this is merely one exemplary embodiment of the invention. In a first embodiment, a first 151 of the defined pattern of holes 150 is disposed proximate a first end of the beam, a second 152 of the defined pattern of holes is disposed proximate an opposite end of the beam, and a third 153 of the defined pattern of holes 150 is disposed proximate the middle of the beam, thereby allowing the wheel bracket 125 to be placed on the beam 115 in one of the three positions, 151, 152, 153, with each respective defined pattern of holes 150 in the wheel bracket 125 and beam 115 being aligned. In a second embodiment, the beam 115 may have only the first 151 and second 152 defined pattern of holes for receiving non-swiveling wheels, and in a third embodiment, the beam 115 may have only the third 153 defined pattern of holes for receiving a swiveling wheel.

Figure 8:
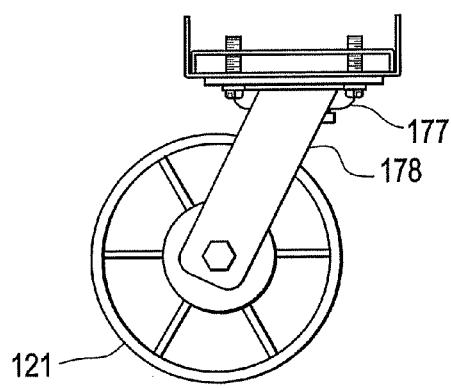
FIG. 8 depicts a side view of a swiveling wheel in accordance with an embodiment of the invention.

As described above, reference numeral 120 has been used to discuss the wheel generally, and it will be appreciated that the wheel may be a non-swiveling wheel or a swiveling wheel depending on the type of mobility desired for the material handling apparatus 100. However, to provide the reader with a better understanding of the differences and similarities between a non-swiveling wheel and a swiveling wheel, a swiveling wheel 121 is depicted in FIG. 8, which can be compared to the non-swiveling wheel 120 depicted in FIG. 5. For example, the non-swiveling wheel 120 has a fixed baseplate 175 and vertical brace 176, while the swiveling wheel 121 has a rotatable baseplate 177 and a slanted brace 178.

Figure 9:
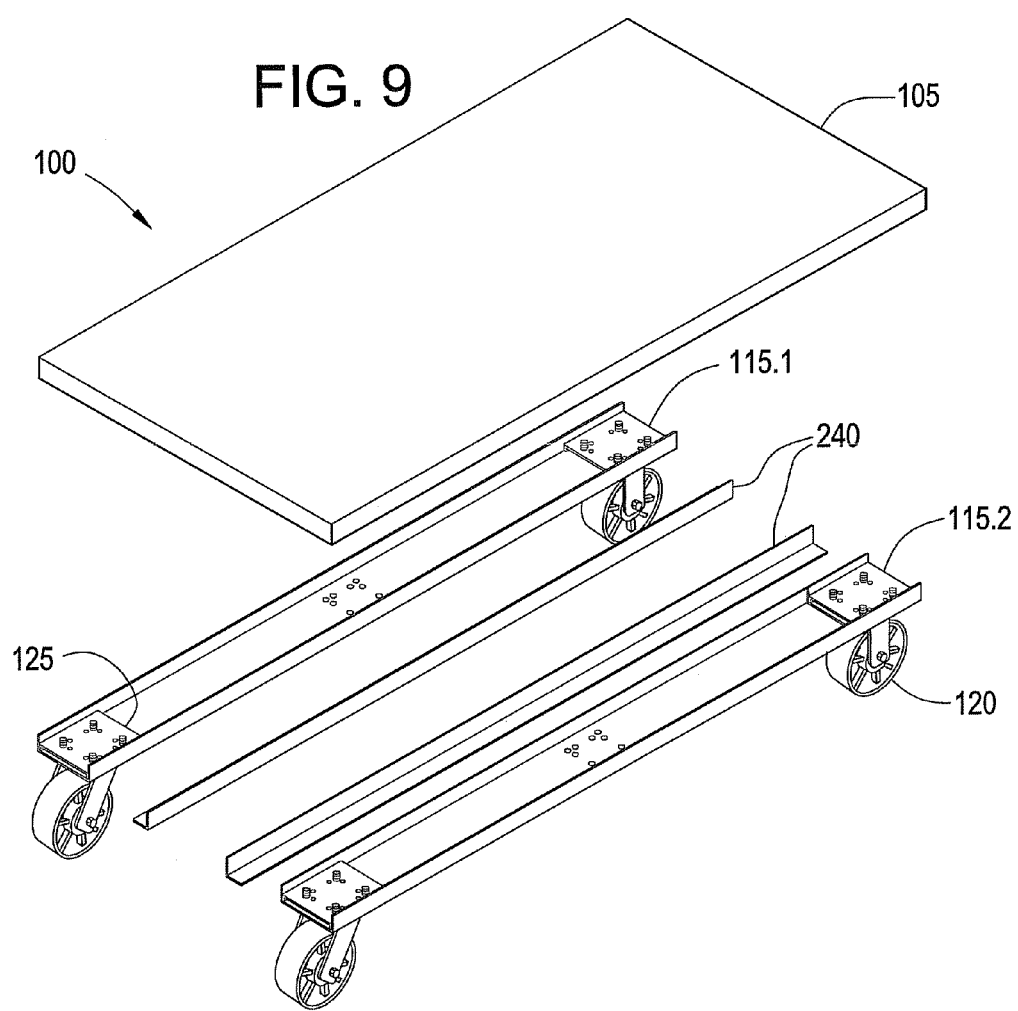
FIG. 9 depicts an exploded isometric assembly view of a material handling apparatus in accordance with an embodiment of the invention.

Referring now to FIG. 9, the material handling apparatus 100 is depicted having two beams 115.1 and 115.2 with similarly arranged wheels 120 and wheel brackets 125 disposed at opposing ends of the respective beams. Here, the wheels 120 are disposed and oriented so that they rotate in a plane parallel to the longitudinal axis 180 of each respective beam (herein referred to as a parallel configuration). While all three of the defined pattern of holes 150 are depicted in the beams of FIG. 9, it will be appreciated that the center defined pattern of holes are not necessarily used, but may be present in the beam to permit stocking in a warehouse of a single beam stocking unit number that is suitable for more than one wheel configuration. While FIG. 9 depicts the wheels in a parallel configuration, it will be appreciated from FIG. 2 that the wheels of the material handling apparatus 100 of FIG. 9 can also be arranged with the wheels disposed and oriented so that they rotate in a plane perpendicular to the longitudinal axis 180 of each respective beam (herein referred to as a perpendicular configuration). Also depicted in FIG. 9 is a pair of support rails 240 that may optionally be used as part of the support portion 110 for supporting the material handling portion 105.

While FIG. 9 depicts material handling portion 105 as a flat platform, it will be appreciated that this is for exemplary purposes only and that material handling portion 105 may be of any configuration suitable for the purposes disclosed herein, with some configurations being discussed below in reference to FIGS. 11-14.

Figure 10:
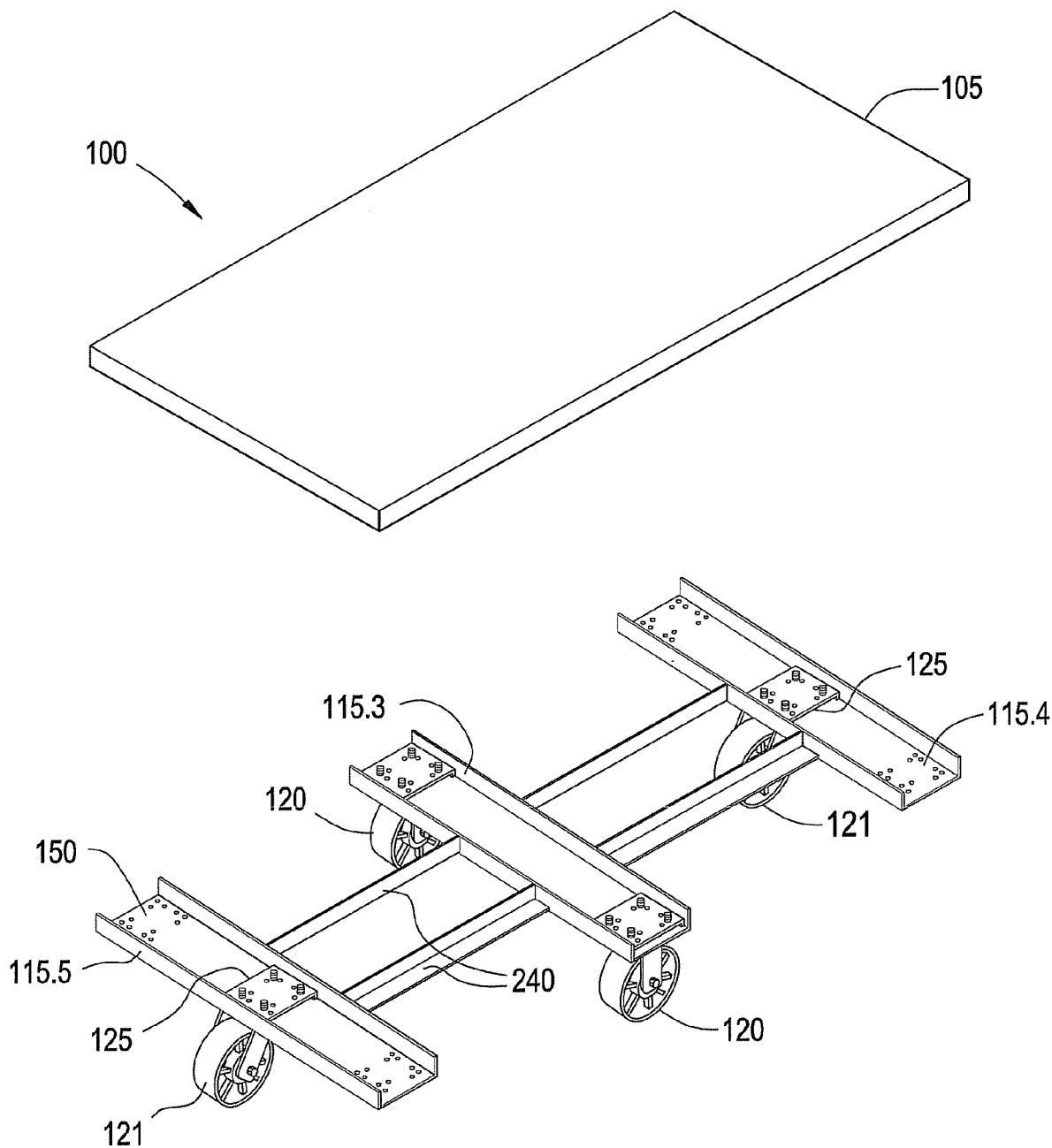
FIG. 10 depict an exploded isometric assembly view of an alternative material handling apparatus to that of FIG. 9.
Figure 11:
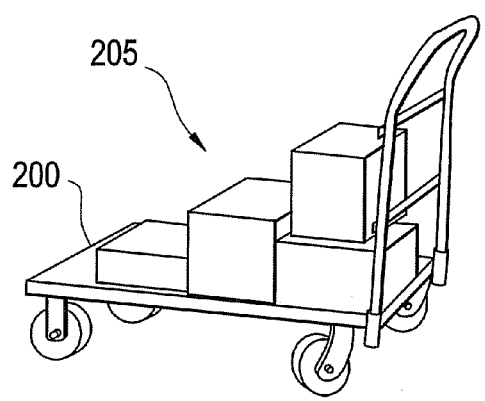
FIG. 11 depicts in isometric view a material handling apparatus in the form of a platform truck in accordance with an embodiment of the invention.
Figure 12:
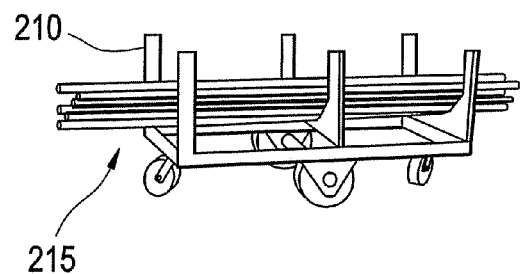
FIG. 12 depicts in isometric view a material handling apparatus in the form of a cradle truck in accordance with an embodiment of the invention.
Figure 13:
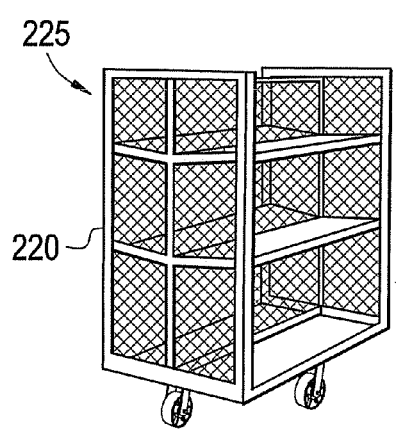
FIG. 13 depicts in isometric view a material handling apparatus in the form of a stock truck in accordance with an embodiment of the invention; and, FIG. 14 depicts in isometric view a material handling apparatus in the form of a movable stock cabinet in accordance with an embodiment of the invention.
Figure 14:
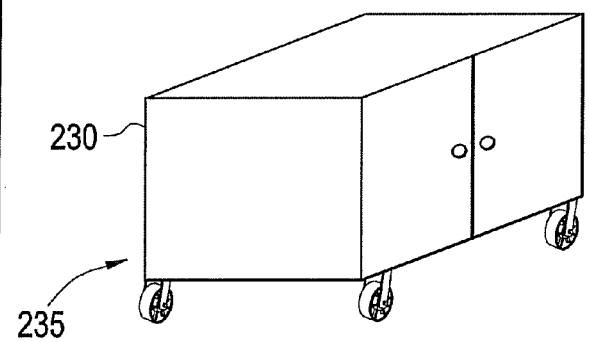

Referring now to FIG. 10, the material handling apparatus 100 is depicted having three beams 115.3, 115.4 and 115.5 disposed on the same plane and parallel to each other, and with the first beam 115.3, configured similar to the beams in FIG. 9 discussed above, disposed between the second 115.4 and the third 115.5 beam. Support rails 240 joining the three beams may be employed for added support and rigidity. Here, the second beam 115.4 and the third beam 115.5 each have the defined pattern of holes 150 at a location proximate the middle of the respective beam, and a swiveling wheel 121 attached to the beam 115 via a wheel bracket 125. In the configuration of FIG. 10, and as a result of the two swiveling wheels, the material handling apparatus 100 is capable of pivoting about a central axis perpendicular to a plane defined by the three beams. While all three of the defined pattern of holes 150 are depicted in all three beams of FIG. 10, it will be appreciated that the unused holes (center pattern unused in beam 115.3, and outboard patterns unused in beams 115.4 and 115.5) may be present in the respective beam to permit stocking in a warehouse of a single beam stocking unit number that is suitable for more than one wheel configuration. While FIG. 10 depicts the wheels of center beam 115.3 arranged in a perpendicular configuration, it will be appreciated from the foregoing discussion that the wheels may also be arranged in a parallel configuration.

Referring now to FIGS. 11-14, embodiments of the material handling apparatus 100 disclosed herein may incorporate a material handling portion 105 that includes a platform 200 for a platform truck 205, a bar cradle 210 for a bar cradle truck 215, a mesh cabinet 220 for a mesh stock truck 225, and an enclosed cabinet 230 for a movable stock cabinet 235. However, it will be appreciated that the exemplary material handling portions and resulting material handling apparatus depicted in FIGS. 11-14 are for illustrative purposes only, and that embodiments of the invention may encompass other types and configurations of material handling portions for creating other material handling apparatus that will benefit from the invention disclosed herein.

From the foregoing it will be appreciated that different length beams and different size wheels may be employed for the different sizes and uses of a particular material handling apparatus. However, by employing a beam having a defined cross-section where only the length varies, and a wheel bracket having a defined size and shape, it is possible to stock a single stocking unit number for the wheel bracket that can be used with a variety of different beam lengths. Also, and as previously mentioned, by punching or drilling three groups of the defined pattern of holes in the beam (at the ends of the beam and at the middle of the beam), it is possible to stock only a few stocking unit numbers for the beam that can be used with a variety of wheel configurations.

While certain combinations of beams 115, wheels 120, 121, and wheel brackets 125 have been described herein, it will be appreciated that these certain combinations are for illustration purposes only and that any combination of any of the beams 115, wheels 120, 121, and wheel brackets 125 may be employed, with appropriate interdependent components as presented herein, in accordance with an embodiment of the invention. Any and all such combinations are contemplated herein and are considered within the scope of the invention disclosed.

While embodiments of the invention have been described using steel as a suitable material for the beam and wheel bracket, it will be appreciated that the scope of the invention is not so limited and also encompasses other materials suitable for the purposes disclosed herein, such as aluminum for example, which may be extruded into a desirable shape and friction stir welded.

As disclosed, some embodiments of the invention may include some of the following advantages: a wheel bracket that provides added stability to fasteners holding wheels to a beam such that orbital motion of the fasteners is restrained; the ability to stock a single wheel bracket for use with any length of beam, and for use with either a swiveling wheel or a non-swiveling wheel; the ability to stock a single beam that may be used with either two non-swiveling wheels disposed at the ends of the beam, or one swiveling wheel disposed at the middle of the beam; and, a beam and wheel bracket having the same single defined pattern of holes for use with a large wheel having fasteners arranged in a square pattern, or for use with a small wheel having fasteners arranged in a rectangular non-square pattern, where either wheel may be oriented for motion perpendicular to or parallel to the longitudinal axis of the beam.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A material handling apparatus, comprising:
a material handling portion; and
a support portion attached to the material handling portion, the support portion comprising:
a U-shaped beam, a wheel disposed on one side of the beam, and a U-shaped wheel bracket disposed on an opposing side of the beam such that an open end of the U-shape of the bracket is oriented facing an open end of the U-shape of the beam, the U-shaped wheel bracket having two legs and a yoke therebetween and being disposed nested within the U-shape of the beam with the legs against the beam and a gap between the beam and the yoke, the two legs extending perpendicular from the yoke;
wherein the beam and the wheel bracket each comprise a defined pattern of identically arranged holes, the defined pattern comprising a first set arranged on a square pattern, a second set arranged on a rectangular non-square pattern, and a third set arranged on a rectangular pattern similar to that of the second set but oriented ninety degrees to the second set, the beam comprising one or more of the defined pattern of holes;
wherein the wheel bracket is disposed having its defined pattern of holes aligned with a respective one of the defined pattern of holes in the beam; and
wherein the wheel, the beam, and the wheel bracket are attached by fasteners passing through one of the three sets of holes and completely traversing the gap, coupling the yoke of the wheel bracket to a yoke portion of the beam.

2. The apparatus of claim 1, wherein:
the beam comprises three of the defined pattern of holes, a first of the defined pattern being disposed proximate a first end of the beam, a second of the defined pattern being disposed proximate an opposite end of the beam, and a third of the defined pattern being disposed proximate the middle of the beam, thereby allowing the wheel bracket to be placed on the beam in one of three positions with each respective defined pattern of holes aligned.

3. The apparatus of claim 1, wherein:
the beam comprises two of the defined pattern of holes, a first of the defined pattern being disposed proximate a first end of the beam, and a second of the defined pattern being disposed proximate an opposite end of the beam;
a first of the wheel and a first of the wheel bracket are attached to the beam by fasteners via the first defined pattern of holes;
a second of the wheel and a second of the wheel bracket are attached to the beam by fasteners via the second defined pattern of holes; and
the first wheel and the second wheel are non-swiveling wheels.

4. The apparatus of claim 3, wherein the support portion further comprises:
a second of the beam comprising two of the defined pattern of holes, a first of the defined pattern being disposed proximate a first end of the second beam, and a second of the defined pattern being disposed proximate an opposite end of the second beam, the second beam being disposed on a same plane as and parallel to the first beam;
a third of the wheel and a third of the wheel bracket being attached to the second beam by fasteners via the first defined pattern of holes in the second beam;
a fourth of the wheel and a fourth of the wheel bracket being attached to the second beam by fasteners via the second defined pattern of holes in the second beam; and
the third wheel and the fourth wheel are non-swiveling wheels;
wherein the first and the second wheel are each disposed to rotate in a plane perpendicular to a longitudinal axis of the first beam, and the third and the fourth wheel are each disposed to rotate in a plane perpendicular to a longitudinal axis of the second beam.

5. The apparatus of claim 4, wherein:
the first beam and the second beam each further comprise the defined pattern of holes disposed proximate the middle of each respective beam.

6. The apparatus of claim 3, wherein the support portion further comprises:
a second of the beam comprising two of the defined pattern of holes, a first of the defined pattern being disposed proximate a first end of the second beam, and a second of the defined pattern being disposed proximate an opposite end of the second beam, the second beam being disposed on a same plane as and parallel to the first beam;
a third of the wheel and a third of the wheel bracket being attached to the second beam by fasteners via the first defined pattern of holes in the second beam;
a fourth of the wheel and a fourth of the wheel bracket being attached to the second beam by fasteners via the second defined pattern of holes in the second beam; and
the third wheel and the fourth wheel are non-swiveling wheels;
wherein the first and the second wheel are each disposed to rotate in a plane parallel to a longitudinal axis of the first beam, and the third and the fourth wheel are each disposed to rotate in a plane parallel to a longitudinal axis of the second beam.

7. The apparatus of claim 6, wherein:
the first beam and the second beam each further comprise the defined pattern of holes disposed proximate the middle of each respective beam.

8. The apparatus of claim 3, wherein the support portion further comprises:
a second beam and a third beam disposed on a same plane as and parallel to the first beam, the first beam disposed between the second and the third beam, the second beam and the third beam each comprising the defined pattern of holes at a location proximate the middle of the respective beam;
a third of the wheel and a third of the wheel bracket being attached to the second beam by fasteners via the defined pattern of holes in the middle of the second beam, the third wheel being a swiveling wheel;
a fourth of the wheel and a fourth of the wheel bracket being attached to the third beam by fasteners via the defined pattern of holes in the middle of the third beam, the fourth wheel being a swiveling wheel.

9. The apparatus of claim 8, wherein:
the first and the second wheel are each disposed to rotate in a plane perpendicular to a longitudinal axis of the first beam.

10. The apparatus of claim 8, wherein:
the first and the second wheel are each disposed to rotate in a plane parallel to a longitudinal axis of the first beam.

11. The apparatus of claim 8, wherein:
the first beam further comprises the defined pattern of holes proximate the middle of the first beam; and
the second and the third beam each further comprise the defined pattern of holes at each end of each respective beam.

12. The apparatus of claim 1, wherein:
the defined pattern of holes in the beam are disposed proximate the middle of the beam; and
the wheel is a swiveling wheel.

13. The apparatus of claim 1, wherein:
the wheel comprises a base plate having a hole pattern matching the first set of holes of the beam and wheel bracket, thereby allowing a non-swiveling wheel to be fastened to the beam and wheel bracket in one orientation so that the wheel can rotate in a plane perpendicular to a longitudinal axis of the beam, or in a second orientation 90 degrees to the first orientation so that the wheel can rotate in a plane parallel to the longitudinal axis of the beam.

14. The apparatus of claim 1, wherein:
the wheel comprises a base plate having a hole pattern matching the second set of holes of the beam and wheel bracket, thereby allowing a non-swiveling wheel to be fastened to the beam and wheel bracket using the second set of holes in the beam and wheel bracket so that the wheel can rotate in a first plane relative to a longitudinal axis of the beam, or fastened to the beam and wheel bracket using the third set of holes in the beam and wheel bracket so that the wheel can rotate in a second plane 90 degrees to the first plane.

15. The apparatus of claim 1, wherein:
the wheel bracket is fixedly secured to the beam independent of the fasteners.

16. The apparatus of claim 1, wherein:
the first, the second and the third set of holes each comprise four holes, thereby resulting in the defined pattern of holes being twelve holes.

17. The apparatus of claim 1, wherein:
the gap between the beam and the yoke serves to restrain orbital movement of the fastener.

18. The apparatus of claim 1, wherein:
the material handling portion comprises one of a platform for a platform truck, a bar cradle for a bar cradle truck, a mesh cabinet for a mesh stock truck, and an enclosed cabinet for a movable stock cabinet.

19. Support portion for a material handling apparatus, the support portion comprising:
a U-shaped beam, a wheel disposed on one side of the beam, and a U-shaped wheel bracket disposed on an opposing side of the beam such that an open end of the U-shape of the bracket is oriented facing an open end of the U-shape of the beam, the U-shaped wheel bracket having two legs and a yoke therebetween and being disposed nested within the U-shape of the beam with the legs against the beam and a gap between the beam and the yoke, the two legs extending perpendicular from the yoke;

wherein the beam and the wheel bracket each comprise a defined pattern of identically arranged holes, the defined pattern comprising a first set arranged on a square pattern, a second set arranged on a rectangular non-square pattern, and a third set arranged on a rectangular pattern similar to that of the second set but oriented ninety degrees to the second set, the beam comprising one or more of the defined pattern of holes;

wherein the wheel bracket is disposed having its defined pattern of holes aligned with a respective one of the defined pattern of holes in the beam; and wherein the wheel, the beam, and the wheel bracket are attached by fasteners passing through one of the three sets of holes and completely traversing the gap, coupling the yoke of the wheel bracket to a yoke portion of the beam.

* * * * *